United States Patent [19]

Noller

[11] 4,100,375

[45] Jul. 11, 1978

[54] TELEPHONE, INTERCOM AND REMOTE CONTROL SYSTEM

[76] Inventor: David Lewis Noller, 10402 1/2 Wheatland Ave., Los Angeles, Calif. 91040

[21] Appl. No.: 760,813

[22] Filed: Jan. 19, 1977

[51] Int. Cl.$^2$ .................... H04M 3/58; H04M 9/02; H04M 11/02

[52] U.S. Cl. .................... 179/2 A; 179/1 H; 179/18 AD; 179/99

[58] Field of Search ............... 179/1 H, 2 A, 18 AD, 179/99

[56] References Cited

U.S. PATENT DOCUMENTS

| | | | |
|---|---|---|---|
| 2,828,364 | 3/1958 | Bliss | 179/18 AD |
| 3,267,379 | 8/1966 | Bloxsom | 179/2 A |
| 3,909,551 | 9/1975 | Marshall | 179/18 AD |
| 3,985,974 | 10/1976 | Jusinskas, Jr. et al. | 179/18 AD |
| 4,006,316 | 2/1977 | Bolgiano | 179/2 A |

OTHER PUBLICATIONS

"Remote Control of Heating Systems in Weekend Cottages", Hans Lardner, TELE, (English Ed.), v. 23, No. 2, 1971, 31–33.

*Primary Examiner*—William C. Cooper
*Assistant Examiner*—Kenneth A. Chayt

[57] ABSTRACT

This system employs the standard single line tone dialing telephone instrument, connected via (typically) existing 4 conductor 22 gauge wire. A telephone hookswitch sensing circuit provides a trigger to connect a tone decoder across the talk path for a period of time established by a time delay circuit. When the instrument is tone dialed, the output of the tone decoder is fed respectively to: a gate circuit which switches the telephone instrument from the local intercom battery to an outside telephone line; a HOLD feature circuit which places the outside call on HOLD; a remote control circuit which turns on and off devices remote from this system; or to individual bells of other instruments within the system.

6 Claims, 2 Drawing Figures

TELEPHONE, INTERCOM AND REMOTE CONTROL SYSTEM

BACKGROUND OF THE INVENTION

1. Field of the Invention

This invention relates to a system that makes modern conveniences more convenient, while reducing the complex network of control switches and wiring. More specifically this system consolidates all the features of the multi-line key telephone, multi-control intercom, and scores of switches and knobs to operate other systems and devices into a 2 digit number dialed at any standard single line telephone instrument within the system or remote from it.

2. Description of the Prior Art

Conventional practice for satisfying the smaller communication and control requirements, up to a point where the key phone becomes practical, has been to use a single telephone instrument for each outside line desired, to provide a separate instrument for intercom requirements, often a wall mounted device, and further, to wire individual switches, knobs and controls for each location and for each separate controlled device or other system utilized.

The controlled device (ie electric lights, drapery operators, motors, electric locks, televisions etc) and the controlled systems (ie CCTV, stereo, telephone, electric gates, intercom, security, etc.) are typically controlled with local equipment mounted switches or are controlled at one or more remote locations with switches mounted on fixed walls with wiring concealed within the walls running exclusively back to the respective device. Often times the control is not in a truly convenient location for its application. Further each device has its own switches and knobs some of similar nature and appearance, others not. Each control employs its own wiring network.

Since most devices are located at one location and their desirable control points can be in many locations, cost and other factors often dictate a reduction of the number of control locations and thus diminish the full utilization of the system capabilities. This problem is compounded with installations into existing structures where control wiring is usually kept to a bare minimum.

These situations often exist due to the limitations imposed by:

1. The cost of wiring more extensively.
2. The need of a fixed mounting surface for controls.
3. Lack of knowledge of the end users control requirements.
4. The need of the individual installers to stay with existing control techniques.

The single line telephone instrument has been relegated basically to the job of communication on a single talk path basis due to its restrictive wiring techniques. The key phone overcame this problem by adding more and more wiring conductors until a large and expensive cable was required to interconnect the instruments. And the PABX overcame the problem, but added a restrictive cost factor and equipment space and maintenance requirements; therefore, this was tailored to only the very large commercial applications.

Therefore it can be readily seen that there is a need for an interface to couple the versatility, mobility and convenience of the decorator telephone to the local control and switching requirements, utilizing the existing wiring. This system offers all of the communication facilities expected of the instrument as an intercom and for use of outside lines. It is a system which can be retro-fitted to existing applications as well as for new construction.

SUMMARY OF THE INVENTION

Accordingly, the difficulties and complexities encountered with conventional communications and control systems noted above are obviated by the present invention which provides the necessary coupling for most forms of controllable devices to a single pair of tones dialed at any instrument and at any location the user may desire.

It is among the primary objects of this invention to provide a unique and convenient operation of all systems from a decorative instrument in as many locations as the user wishes without elaborate wiring networks.

Another object of this invention is to provide a novel application of the decorator telephone in conjunction with an automated master controlling system. This transforms the individual instrument from a direct dialed intercom, to a central system command center, to a full feature key phone, with multiple lines at its disposal and aided by full hold and conferencing ability.

Still another object of this invention is to provide miscellaneous installers with a novel and convenient technique to operate their apparatus without running extensive wiring. This is accomplished with small wired and wireless output modules to perform the necessary control functions at the controlled apparatus via the phone system rather than at a remote wall location.

A further object of the present invention is its novel ability to maintain future flexibility and growth potential within the controlling network, obviating obsolescence of, and incompatibility with future systems to be controlled. This is a product of the modular or stacking design which allows future additions of the necessary input and output channels and provides for an ever-changing demand for controlling elements.

BRIEF DESCRIPTION OF THE DRAWING

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
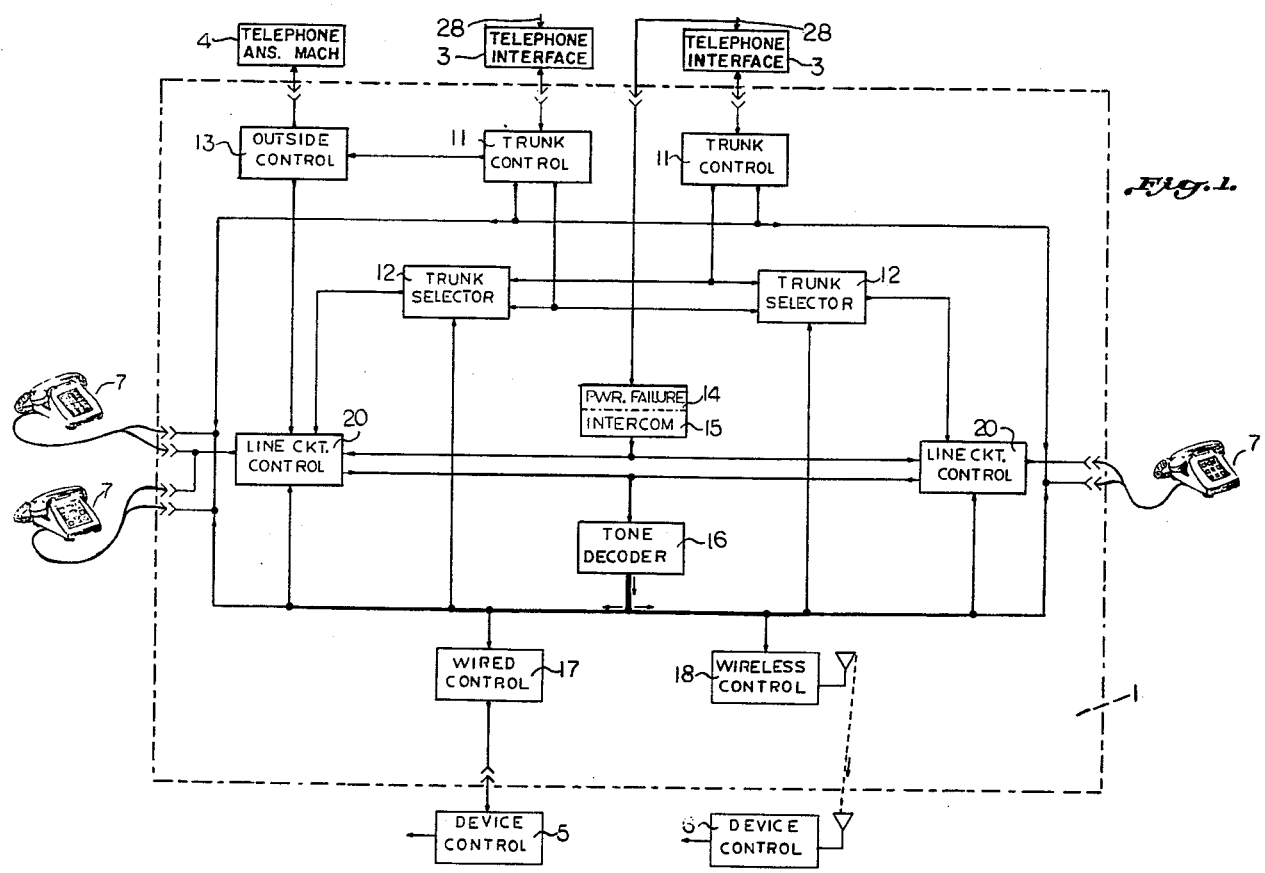
FIG. 1 is a block diagram of a typical system illustrating the flexible circuit configurations.

Referring to FIG. 1, the novel telephone remote control system is illustrated in block diagram form. The unique control is illustrated within the broken lines indicated by arrow 1. Outside lines from the utility company are connected thru their interface devices 3. Device 4 represents any conventional telephone answering machine used to receive telephone calls when the phones are unattended. Device Control 5 is a relay used to operate necessary switch closures on remotely controlled systems (i.e., drapery operators), and is located at the device or system to be controlled. Control 6 is similar in function to 5 but operational command is via wireless remote control from the control center. 7 is one or more conventional touch tone telephones wired in parallel of any manufacture. Trunk control 11 is essentially a conventional 400 KSU circuit used to provide hold features and ring detection. Trunk selector 12 essentially gates one of the multiple incoming lines to the instrument. Outside line control 13 couples incoming calls to the system for remote operation of system features. Intercom 15 provides talk battery for the local intercom, and 14 is a relay which connects the outside lines directly to the instruments in case of power failure. The tone decoder 16 detects all standard tones from each instrument and provides a one second 105VAC 20HZ output for each code combination operated and ports each via individual wires to each designated function input. Circuit 17 converts the 20HZ signal to a latching circuit which connects via a 2 conductor wire to each device control, and returns a 60HZ hum when the circuit has been turned off to the instrument receiver 7. Circuit 18 provides the same function as 17 and induces a wireless transmitter to signal the operation of device control 6.

Line circuit control 20 is a novel design which senses the commands of the telephone instruments 7 and directs the application of tone and switch-hook commands to provide intercom battery 15, outside line 3, direct tone operation of the remote control, 5 & 6 or bell signaling to each telephone instrument.

Not shown, but connected to all circuits is a suitable KSU power supply with provisions for 10VAC, 20VDC filtered talk battery, 24VDC and 105VAC 20HZ ring supply. The supply operates from 115VAC sources.

Figure 2:
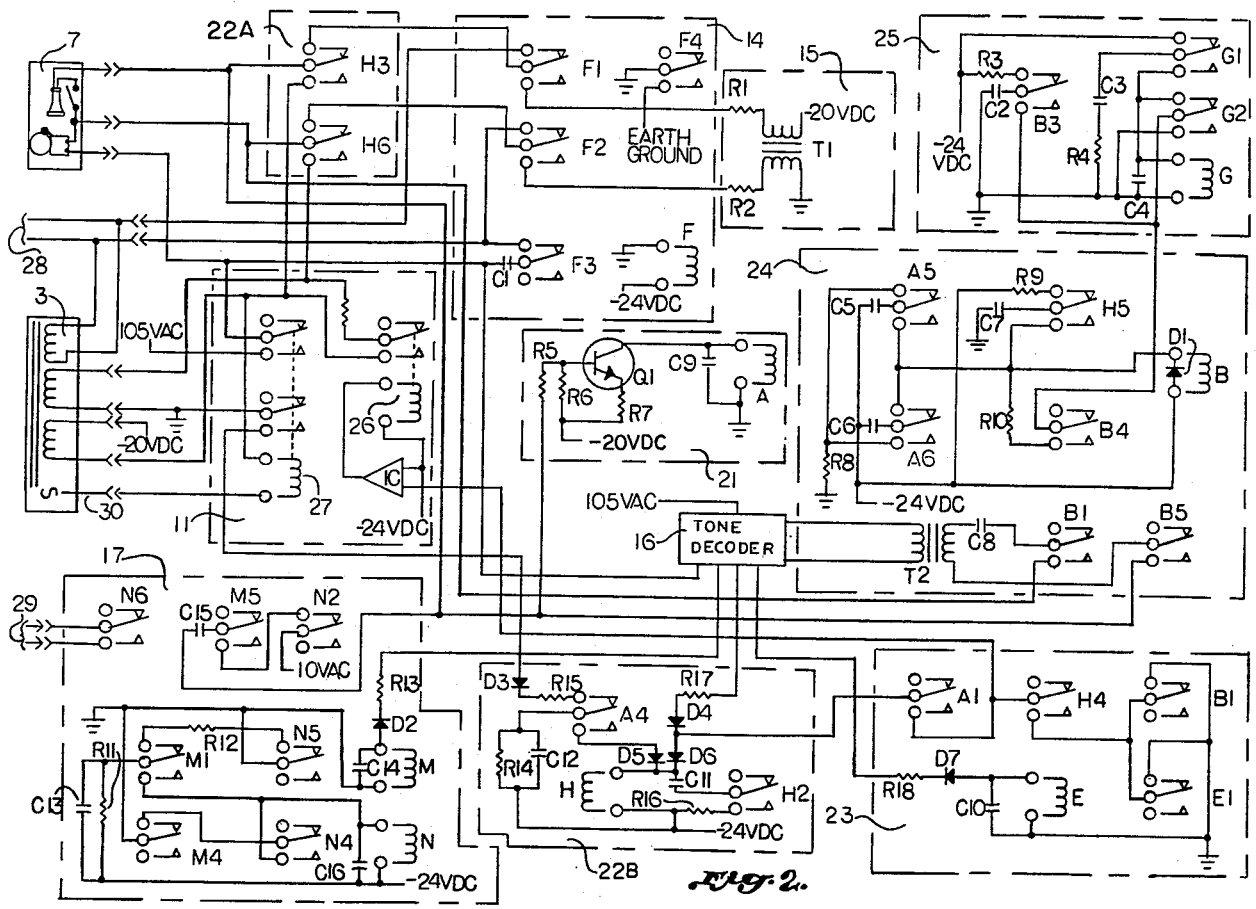
FIG. 2 is a schematic diagram of the novel telephone remote control system incorporating a representative example of each novel circuit.

Referring to FIG. 2, the novel telephone remote control system is illustrated in schematic form. Line circuit 20 of FIG. 1 is further illustrated within broken lines indicated by arrows 21 thru 25. Hookswitch sensing circuit 21 operates relay A when any corresponding telephone 7 is lifted from its receiver. Talk Path gate 22A shifts the operation of telephone 7 from inhouse communications to an outside line. Outside line HOLD feature control 23 maintains the operation of 22B. Tone decoder control 24 switches the input of the decoder 16 across the talk path at appropriate times. Time delay circuit 25 releases the decoder control 24 after a specified period of time.

Arrow 3 symbolizes the functional components of the utility company's telephone interface device, and 30 connects the 105 VAC generated within the interface to signal the presence of an incoming call. Arrow 11 symbolizes the essential components of the conventional 400 KSU. While 27 receives the signaling of an incoming call, 26 responds to a demand from 23 to put a dummy load across the line, placing it on HOLD.

In the ready but non-operational condition, relay F of 14 is energized, coupling talk battery from 15 thru the normally open contacts F1 and F2, normally closed contacts H3 and H6 to the waiting instrument. Transistor Q1 of 21 is reversed biased by the negative potential supplied thru R5 current limiting resistor from the wiper of H3.

Storage capacitors, C2, C3, C5, C7 and C13 build a full potential charge of 24 volts thru resistors and relays contacts R3 & B3; R4 & G1; R8 & A5; R9 & H5; and R12, M1 & N5 respectively. The resistors limit the charging rate as arc protection for the respective relay contacts.

When the receiver 7 is lifted, a load coil is placed across the talk battery, now supplied to the telephone instrument. The negative potential on the base of Q1 becomes more positive due to the voltage-divider network created by R1, the telephone set, and R2, causing Q1 to conduct and thereby operate relay coil A.

As A5 contacts close, C5 is discharged into the coil of relay B. Capacitor C6 is now beginning to charge thru contacts A6 and R8/

With the B relay energized momentarily thru the discharge of C5, contacts B3 close, discharging capacitor C2 of a negative charge into capacitor C4 thru contacts G2, normally closed. Capacitor C4 discharges into relay coil G causing it to energize. With relay G momentarily closed, contacts G1 discharges capacitor C3 thru contacts G1, normally open as a holding potential to the coil of relay G. Discharge time is approximately 5 seconds. With the G relay closed, contacts G2 N.O. now supplies a positive holding current to the coil of relay B thru contacts B4 N.O. and voltage divider R10. Contacts B1 & B5, now closed, couple the input of the tone decoder 16 across the tip and ring, wiper H3 and H6, of the telephone instrument 7 via the coupling transformer T2 and DC isolation capacitor C8.

The desired function to be performed by the system is selected, and the corresponding digit is depressed on the tone generating pad of the telephone instrument 7. Assuming the selection was to signal another telephone instrument, the tone generated and fed to the tone decoder would produce a 105 VAC 10HZ output from the decoder 16, at a port hardwired via a connector, to the bell of the selected instrument. The operating current would travel thru the bell coil to the common or ground side of the talking pair, thru contacts H6, F2, R2 & T1 to the common ground.

Another instrument then coming off hook, would also be across the common talk battery, providing the intercom function to the system.

When remote control operation is to be used and the corresponding digit was depressed and fed to the tone decoder, the output of 105VAC would be ported to one of the remote control circuits 17. The one second 105VAC is fed to relay coil M via limiting resistor R13, rectifying diode D2 and filtering capacitor C14. With relay M energized, contact M1 connects capacitor C13 to the coil of relay N charging capacitor C16 and energizing the N coil. The capacitor C13 has a discharge rate capable of holding the N coil for approximately 2 or 3 seconds. When the one second 105VAC to the M coil terminates and the M relay contacts open, C16 holds the N relay energized while the M4 contact returns to its N.C. position, which then supplies a holding current to the N coil via the N.O. N4 contacts. With the M1 contacts again in the de-energized position, R12 is again connected to the C13 capacitor. However, as the N2 contact is still energized, no charging current is fed to C13 and any remaining charge on C13 is blead off thru R11. While the N relay is energized, the N6 contact is closed and this switch closure is hardwired via 29 to the remote device to be turned on.

To reverse the condition and shut off the remote device, the same digit is fed to the tone decoder and once again the M relay is energized for one second. The M1 contact again is connected to the N relay coil, however it does not now carry a charge. At the same time the M4 contact which is in series with the existing hold path for the N coil opens, removing the holding current. The N contacts fall off immediately, while the M contacts stay closed for the duration of the one second decoder output. The resulting configuration of the M5 and N2 contacts connects a 10VAC potential across the talkpath via capacitor C15 producing an AC hum to the listening ear, signifying that the remotely controlled device has been turned off. When the N6 contact opened, the remote device was turned off.

Now to assume that the user wants to make a call to the outside thru the telephone utilities network: Dial the digit nine on the tone pad of the instrument 7, the resulting one second output of the tone decoder 16 is connected to the input of circuit 22B. The 105 VAC is fed to the coil of the H relay via limiting resistor R17, and rectifying diodes D4 and D6. When the H relay has energized an H4 contacts close, a holding path is established to maintain the H coil via blocking diode D6, the N.O. A1 contacts, H4 and E1 N. C. An /A/ lead potential is sent to circuit 11 from the wiper of H4 as a prerequisite to circuit 26, performing a HOLD function. With the H coil energized, H3 and H6 contacts close, coupling the instrument 7 which is connected to their wiper position, to the outside telephone lines via the utility interface, 3, and the trunk control circuit (400KSU) 11. Also, when contacts H5 close, capacitor C7 is coupled to the coil of the B relay, discharging a direct negative potential to the coil and thru R10 causing the coil to de-energize and the B contacts to open, removing the tone decoder, 16 from the connection with the instruments 7 tone pad. Tone dialing into the utility network is now possible without producing any response within this system.

Having established an outside call connection thru the utility, and wanting for any reason to utilize the tone decoder, 16 for any local control functions, including placing this call on hold, the user will flash the hookswitch of his instrument, reverse biasing the transistor Q1, de-energizing relay coil A for just a moment. While contact A1 will open and remove the holding current to relay coil H, capacitor C11 will maintain a holding current to the H coil thru limiting resistor R16, and contacts H2 for one-half second until the A1 contact is restored. While the contact A6 is de-energized, it will connect the capacitor C6 to the relay coil B causing it to energize and B will now remain energized for 5 seconds via the holding path outlined prior, even after the A6 contact is restored.

If at this time the user wants to place the existing outside call on HOLD, the zero button is depressed and the output of the decoder 16 is fed to relay coil E of circuit 23 via limiting resistor R18 and rectifying diode D7 and filtering capacitor C10. To cause the 400 KSU circuit 11 to close relay 26, putting the dummy load across the line, the /A/ lead potential must be removed just prior to the removal of the load placed across the line by the telephone instrument 7. By energizing relay E, and opening N.C. contacts E1, while N.C. contacts B1 are already open, the holding path to relay H is removed, and the /A/ lead potential to the 400 KSU circuit 11, is also removed. Capacitor C11 is still holding the coil of the H relay for an additional half second before dropping out, and the instrument load, 7 is maintained across circuit 11 while relay H is energized. When capacitor C11 fully discharges prior to the release of relay E, relay H de-energizes, returning the instrument talk path leads to the N.C. side of contacts H3 and H6, across the local intercom battery. Relay 26 detects the two disconnects, first the "A" lead, and then the instrument load 7, in the correct order and places the outside line on HOLD. To retrieve the call on HOLD the user again dials nine, reinstating the original circuit function, being reconnected to the outside line.

Incoming calls from the utility telephone company produce a 105VAC current to be placed across the coil of relay 27, of circuit 11, energizing same. The closure of contacts within this relay, causes 105VAC to be directed to the bell leads of all local telephones, the current traveling thru the bell coil to ground as described earlier. Other contacts on relay 27 cause a ground potential to be connected to capacitor C12 of circuit 22B via the N.C. contacts of A4, limiting resistor R15, and blocking diode D3. When the telephone instrument 7 is taken off hook and relay A energizes, as previously described, A4 contacts close, connecting capacitor C12 to the coil of relay H via blocking diode D5, causing the H coil to energize. Capacitor C11, is isolated from the H coil until after it has been energized by contacts of H2 to prevent the limited potential of C12 from dissipating into the heavier potential of C11, thus possibly preventing the H coil from fully energizing. Once energized, a holding path is established thru D6, A1, H4 and E1 as described earlier.

If an incoming call, from the utility telephone company arrives at a point in time when the instrument 7 is already in use, the energized A relay contact A4 prevents the capacitor C12 from receiving the necessary charge potential to cause the H relay to energize. When the user returns the instrument to its cradle and the A4 contact returns to the closed position, the C12 capacitor will charge and when the receiver is again lifted the H coil will energize. Resistor 14, across capacitor C12, bleeds off any residual charge during non ring-in conditions.

Power failure conditions will cause the F relay of circuit 14 to de-energize, and contacts F1, F2, F3 & F4 to revert to their normally closed positions. F1 and F2 lift the instrument's tip and ring leads from the local talk battery source and place them directly across the utility telephone lines, by-passing the interface and all other circuits. Contact F3 returns the system to a bridged ringing condition, by placing capacitor C1 from the instrument 7 bell lead to the tip side of the utility telephone lines. Contact F4 removes the earth ground normally placed on the power supply ground for noise suppression, but incompatable with the present connection directly to the telephone lines.

When installing this system, no more than the normally existing three conductor wire is needed between the instruments and the central equipment. This charistic makes a rapid installation, by merely placing this novel circuit in a series relationship between the phone lines from the street and the existing wiring within the establishment, expanding manyfold the abilities of the telephone instruments thruout.

In connection with this invention, it should be noted that the values given for the various components are not absolute and that the values will vary according to specific parameters of the system. Therefore, specific component values are not listed.

It should be further noted that such sub-assemblies as the 400KSU circuit card, Touch Tone Decoder, Interface Devices, simple relay assemblies and wireless transmitter and receivers were not covered in detail due to their wide spread use and obvious compatability with respect to specific areas of this invention.

In view of the foregoing it can be seen that maximizing the capabilities of the conventional telephone instrument, allowing for expansion and diversity, without perpetuating the mania for more and more buttons, switches, knobs and miles of support wiring, is truly a novel deviation from long standing tradition.

While particular embodiments of the present invention have been shown and described, it will be obvious, to those skilled in the art, that changes and modifications may be made without departing from this invention in its broader aspects and, therefore, the aim in the appended claims is to cover all such changes and modifications as fall within the true spirit and scope of this invention.

What is claimed:

1. In combination with a key service unit including a digital tone decoder; power supply; a 400 KSU; a utility telephone company interface; and a plurality of single line telephone instruments with digital tone dialing, a combined remote control, intercom and telephone system comprising:
    a telephone hookswitch sensing circuit operatively connected to said telephone instruments for triggering a tone decoder control circuit, conditioning the talk path gate circuit to energize with incoming calls when said telephone instrument is not in use, and canceling said conditioning at the termination of the call;
    a tone decoder control circuit operatively connected to said hookswitch sensing circuit responding to a telephone off hook and coupling the input of said tone decoder to the talk path of said telephone instruments;
    a time delay circuit operatively connected to the tone decoder control circuit to maintain operation of same for a predetermined time interval;
    a talk path gate circuit which shifts the operation of said telephones from intercom talk battery to said telephone interfaces in response to said tone decoder output or said 400 KSU circuits signaling of an incoming call, and cancels the operation of said tone decoder control circuit during tone signaling thru the telephone company network;
    a HOLD feature control circuit operatively connected to the output of said tone decoder and triggering the operation of said 400 KSU circuits initiating the condition of outside call holding;
    A bi-stable remote control circuit operatively connected to said tone decoder causing a maintained switch closure for operation of remote devices in one mode and a maintained open switch condition in the alternate mode, producing an audio hum on the talk path for approximately one second during the transition from closed to open switch conditions.

2. The invention as defined in claim 1 wherein said hookswitch sensing circuit includes two storage capacitors alternately charging then discharging into said tone decoder control circuit.

3. The invention as defined in claim 2 wherein said talkpath gate circuit includes a storage capacitor which charges from the output of said 400 KSU circuit signaling an incoming call, and then transfers with the operation of said hookswitch sensing circuit to discharge into, and causing the operation of, said talk path gate circuit.

4. The invention as defined in claim 3 wherein said tone decoder control circuit includes a resistor in series, and a capacitor switched in parallel with, the holding path of said tone decoder control circuit such that with the operation of said talk path gate circuit, the capacitor switched into a parallel connection will discharge a greater current, of reverse polarity, than that supplied as holding current by said resistor, causing said tone decoder control circuit to cease operating.

5. The invention as defined in claim 4, wherein said time delay circuit includes three storage capacitors, the first passing a negative charge to the second with the operation of said tone decoder control circuit, the second discharging into said time delay circuit holding it in the operate mode while the third capacitor is switched to maintain said time delay circuit for the duration of the charge within the third capacitor.

6. The invention as defined in claim 5 wherein said HOLD feature control circuit includes parallel contacts supplying holding current to said talk path gate circuit requiring operation of said tone decoder control circuit and said HOLD feature control circuit simultaneously to initiate the holding function within the 400 KSU circuit.

* * * * *